United States Patent [19]

Erdelitsch et al.

[11] Patent Number: 4,791,253
[45] Date of Patent: Dec. 13, 1988

[54] STEERING COLUMN SWITCH

[75] Inventors: Herbert Erdelitsch; Walter Hecht; Horst Rachner, all of Bietigheim-Bissingen, Fed. Rep. of Germany

[73] Assignee: SWF Auto-Electric GmbH, Bietigheim-Bissingen, Fed. Rep. of Germany

[21] Appl. No.: 117,177

[22] Filed: Nov. 4, 1987

Related U.S. Application Data

[63] Continuation-in-part of Ser. No. 8,616, Jan. 29, 1987, abandoned.

[30] Foreign Application Priority Data

Feb. 7, 1986 [DE] Fed. Rep. of Germany ....... 3603820

[51] Int. Cl.$^4$ .............................................. H01H 3/16
[52] U.S. Cl. ................. 200/61.27; 200/61.54
[58] Field of Search ................. 200/61.27, 61.3, 61.31, 200/61.34, 61.35, 61.54

[56] References Cited

U.S. PATENT DOCUMENTS

| | | | |
|---|---|---|---|
| 3,892,932 | 7/1975 | Erdelitsch et al. | 200/61.3 X |
| 4,142,076 | 2/1979 | Bird | 200/61.27 X |
| 4,327,264 | 4/1982 | Botz et al. | 200/61.54 X |
| 4,336,428 | 6/1982 | Berginski | 200/61.54 |
| 4,414,442 | 11/1983 | Berginski et al. | 200/61.27 |
| 4,423,297 | 12/1983 | Berginski | 200/61.54 |

*Primary Examiner*—J. R. Scott
*Attorney, Agent, or Firm*—James B. Raden

[57] ABSTRACT

This invention relates to an electric switch, especially to a steering column switch. The switch comprises an insulation plate, a switch lever and a switching member, which are jointly swivellably mounted on the insulation plate in a swivelling plane extending perpendicular to a swivelling shaft and which are tiltable from this plane. In the swivelling plane, the lever and switching member can occupy several operating positions. The various operating positions are defined by a locking cam and a detent. One of these two elements is positioned on a locking lever. One end of said locking lever is swivellably mounted about a shaft parallel to the swivelling shaft of the switching member and the locking member is resiliently prestressed against the switching member. In order to prevent the switch lever and the switching member from shaking in the rest condition and to provide a smooth movement of the switch lever and switching member in a changeover between the operating positions, the switching member is guided in the swivelling plane by the switch lever. Thus, the guide can be maintained without an additional space requirement. Due to the guide, the switching member does not strike any other piece parts of the switch so that underside noise is also reduced.

10 Claims, 3 Drawing Sheets

STEERING COLUMN SWITCH

BACKGROUND OF THE INVENTION

This is a continuation-in-part of application Ser. No. 8,616, filed Jan. 29, 1987, and now abandoned.

This invention relates to a steering column switch. German OS No. 3,211,672 teaches a steering column switch for motor vehicles including a wiper-washer-switch and a turn-signal and headlamp beam control switch. The two individual switches have both a switch lever, onto which a ring-shaped switching member is integrally formed. The switching member extends around the steering spindle. Each switching member is swivellably mounted about a swivelling shaft extending in parallel to the steering spindle shaft and penetrating the switching member. By swivelling the switch lever the wiper operations can be started and terminated and lane changes can be indicated by the turn-signal and headlamp beam control switch. A washing operation can be initiated by tilting the wiper-washer-switch. By tilting the turn-signal and headlamp beam control switch the headlamp flasher can be operated and the headlamp beam can be changed over. The switching member may be secured in the various operating positions by means of several locking members. For this purpose a serrated locking cam is worked into the wiper-washer-switching member at a position approximately diametrically opposite the swivelling axis, in which locking cam engages by means of a triangular locking lug either integrally formed with the switch lever or formed as a separate part a spring-loaded locking lever swivellably mounted about a shaft parallel to the steering spindle shaft.

Because of the two-part guide construction taught on German OS No. 3,211,672 an undesired noise development has to be feared as early as in the rest condition of the switches. The insulation plates therein extend at a spacing from the switching member due to unavoidable tolerances. Thus, the switching member can inadvertently be tilted relative to the swivelling plane by vibrations occurring in the course of the driving movements of the motor vehicle and strike an insulation plate to cause a striking noise to appear. Also, due to the tolerances, the relatively long switch lever can additionally undergo undesired tilting motions about its longitudinal shaft when the switching member is moved into the various switching positions so that the switching member can also strike the insulation plates causing a striking noise to occur. Furthermore, the switching security can be impeded thereby.

A wiper-washer-switch substantially having the same construction as the steering column switch according to the German OS No. 3,211,672 is known from the U.S. Pat. No. 4,414,442. The switching member of this steering column switch has an L-shaped projection protruding beyond the underside of the switching member so that a groove is formed. A tongue engages in this groove, which tongue is formed onto an insulation plate. In principle, a good guide of the switching member and of the switch lever is, thus, possible in the swivelling plane. However, it is a disadvantage of the steering column switch according to the U.S. Pat. No. 4,414,442 that the L-shaped projection and the tongue require additional space below the switching member.

SUMMARY OF THE INVENTION

It is an object of the present invention to create a switch whose switch lever and switching member are always accurately guided in the swivelling plane. By this measure, undesired noises effected by various parts striking each other are prevented to a great extent without requiring costly measures and without requiring much space.

The above-discussed problems are solved by an electric switch in accordance with the present invention wherein the switching member is guided in the swivelling plane by the locking lever. Thus, the space required by the locking lever in any event also is used for guiding the switching member. This additional guide prevents the switching member from unintendedly contacting other parts of the electric switch so that noises are reduced.

In a preferred embodiment of the present invention, the locking lever is guided on the insulation plate by its free second end in its swivelling plane. Thereby, the locking lever will always occupy the same plane.

When the locking member is divided by a film hinge the result is that the locking cam cannot transmit noises onto the switch wall. Thus, a noise decoupling is achieved by the film hinge.

A particularly safe guide of switching member and switch lever is achieved by provided the locking lever opposite the swivelling axis relative to a center line and, thus, at the end farthest from the switch lever handle.

BRIEF DESCRIPTION OF THE DRAWING

Other features, advanatages and applications of the present invention will become apparent from the following description of an embodiment of the present invention taken in conjunction with the accompanying drawings wherein.

DETAILED DESCRIPTION

Figure 1:
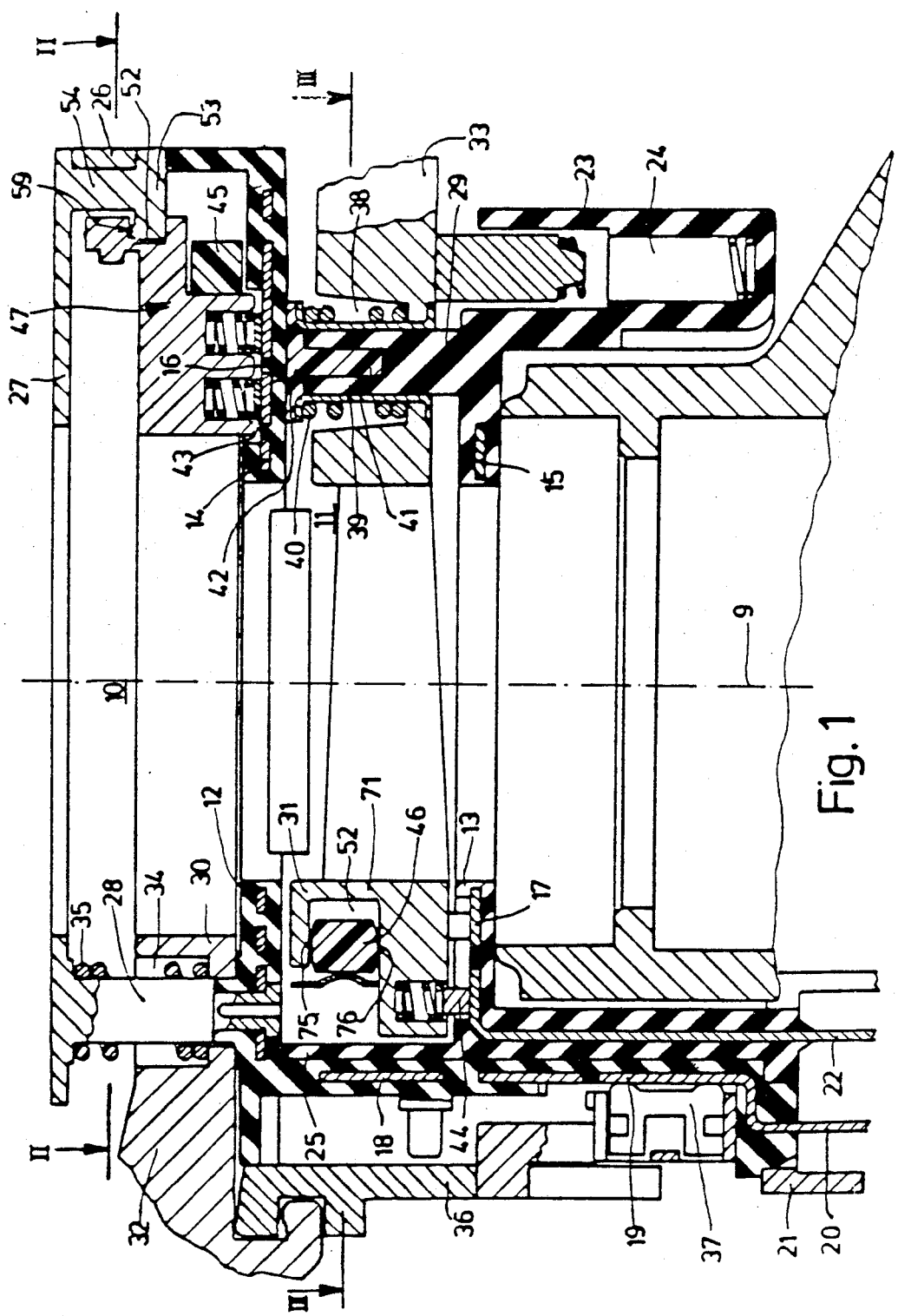
FIG. 1 is a longitudinal section through the steering column switch.

In two planes positioned one below the other, the steering column switch has a turn-signal and headlamp beam control switch 10 and a wiper-washer-switch 11. Both individual switches 10 and 11 include a substantially ring-shaped insulation plate 12 or 13, in which conductors 14 or 15 are embedded, which are uncovered in particular places of the insulation plates 12 and 13 and which form there stationary contacts 16 or 17 of the turn-signal and headlamp beam control switch 10 and of the wiper-washer-switch 11. The two insulation plates 12 and 13 have a center line 9 in common. The insulation plate 12 of the turn-signal and headlamp beam control switch 10 is, in a rim area, perpendicularly bent downwards, in which area it is also provided with conductors 18 which are uncovered in areas 19 also forming stationary contacts. The lower ends of the conductors 18 are formed as plug pins 20 and project into a frame 21 formed on the insulation plate 13. The insulation plate 13 of the wiper-washer-switch 11 is perpendicularly bent downwards in the same area as the insulation plate 12 of the turn-signal and headlamp beam control switch 10 and has plug pins 22 projecting into the frame 21. A receiver 23 with a closed bottom which extends perpendicularly downwards from the insulation plate 13 of the wiper-washer-switch 11 is formed essentially diametrically opposite the plug pins 22 relative to the center line 9. In the receiver 23 there is arranged a switching mechanism having the reference numeral 24, by which mechanism the washer system for a windshield and the wiper-washer-system for a motor vehicle rear window can be controlled.

Both switches 10 and 11 have side walls 25 and 26 extending perpendicularly upwards and formed onto the rims of the insulation plates 12 and 13. The upper closure of the steering column switch is formed by a cover 27 which rests upon the side walls 26 projecting from the insulation plate 12 of the turn-signal and headlamp beam control switch 10.

Both the turn-signal and headlamp beam control switch 10 and the wiper-washer-switch 11 have a bearing pin 28 or 29, which projects perpendicularly therefrom. The bearing pin 28 is formed onto the cover 27 and the bearing pin 29 onto the insulation plate 13. These bearing pins 28 and 29 form swivelling axes for two ring-shaped switching members 30 and 31 which can be moved by means of switch levers 32 and 33 with which they are integrally made. The bearing pin 28 is positioned in a slight longitudinal recess 34 of the switching member 30 and is surrounded by a spiral spring 35. The lower end of spring 35 is supported by the lower limiting rim of the recess 34 and its upper end by the cover 27. Normally, the spiral spring 35 holds the switching member 30 and the switch lever 32 onto the insulation plate 12 of the turn-signal and headlamp beam control switch 10. However, the size of the recess 34 permits the switching member 30 and the switch lever 32 to be pulled toward the cover 27 against the force of the spiral spring 35. Thus, the switching member 30 can be tilted from its swivelling plane lying parallel to the insulation plate 12. With regard to the center line 9, the axis for this tilting action is positioned opposite the bearing pin 28 and, thus, opposite the swivelling axis of the switching member 32. When tilted, the switching member 32 can move a bridging contact 37 suspended in a driver 36. Thereby, the headlamp flasher can be realized and a changeover to full beam or low beam can be effected.

The bearing pin 29 projects through a round recess 38 in the switching member 31 and is surrounded by a bushing 39 which itself is surrounded by a spiral spring 40. The spiral spring 40 is supported with its lower end on the bottom of the recess 38 and with its upper end on a collar of the bushing 39. A pocket hole 41 is formed in the upper end of the bearing pin 29 into which pocket hole a plug-like member 42 is inserted. The plug-like member 42 rests against the upper end of the collar of the bushing 39 and against the lower surface of the insulation plate 12 of the turn-signal and headlamp beam control switch. The spiral spring 40 normally holds the switching member 31 to the insulation plate 13. The size of the recess 38, however, permits the switching member 31 to be pulled toward the insulation plate 12 of the turn-signal and headlamp beam control switch 10 against the force of the spiral spring 40. Thus, the switching member 31 lying parallel to the insulation plates 12 and 13 can be tilted from its swivelling plane. Thereby, a rear window wiping and washing action can be initiated.

The insulation plates 12 and 13 are arranged in such a way, relative to the center line 9, that the bearing pins 28 and 29 are positioned approximately diametrically opposite each other. Spring-loaded bridging contacts 43 and 44 are inserted into the switching members 30 and 31, which switching contacts can be brought into operative connection with the stationary contacts 16 or 17 by swivelling the switch levers 32 or 33. Thereby, lane changes can be indicated in the case of the turn-signal and headlamp beam control switch 10. As regards the wiper-washer-switch 11, the windshield wipers can be operated at different speeds. The various switching positions of the two switching members 30 and 31 are determined by two locking levers 45 or 46.

A high degree of switching security and accuracy as well as excellent guidance of the switching member 30 or 31 and, thus, of the switch lever 32 or 33 is ensured for both the turn-signal and headlamp beam control switch 10 and for the wiper-washer-switch 11 by this construction. This will be described below initially by way of the turn-signal and headlamp beam control switch 10.

Figure 2:
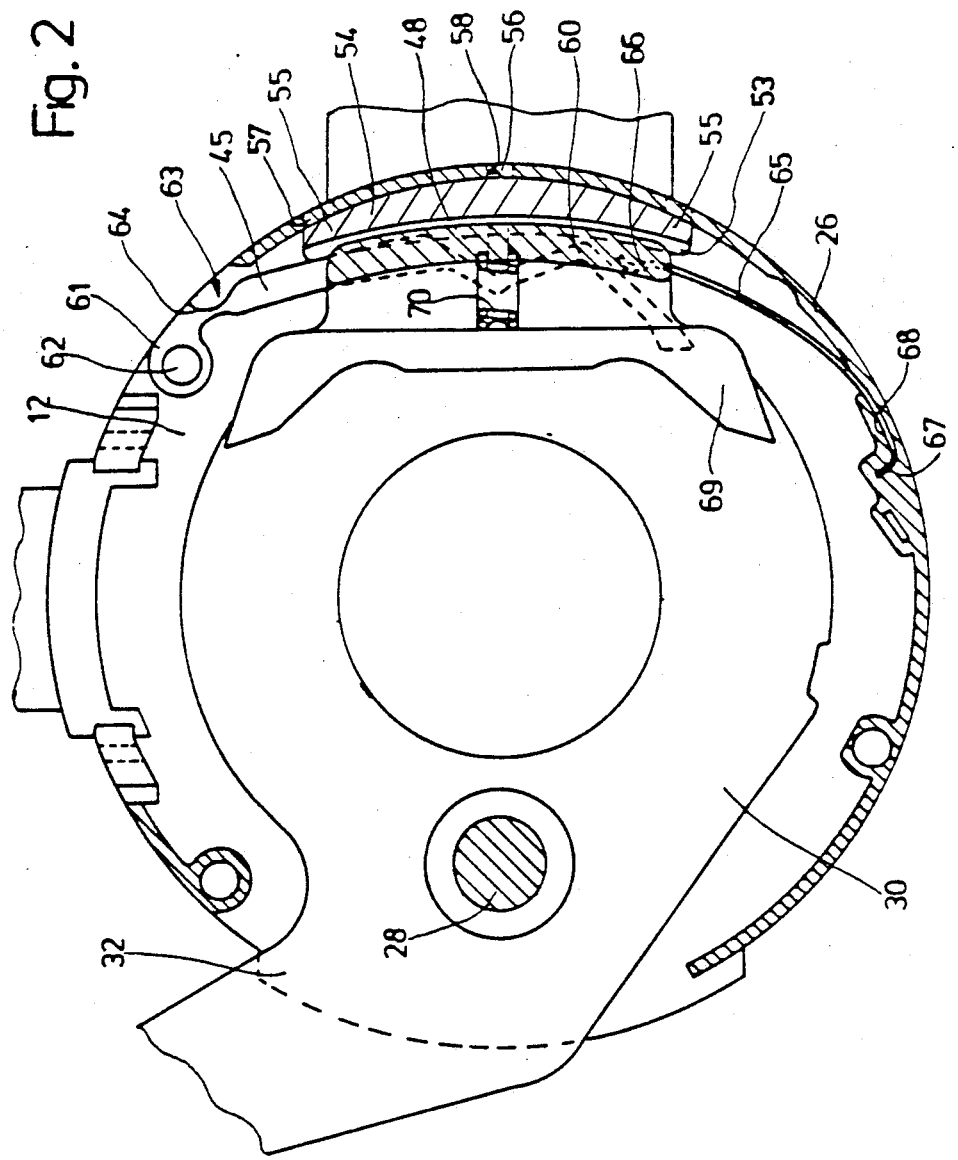
FIG. 2 is a section taken on line II—II of FIG. 1 through a turn signal and headlamp beam control switch being part of the steering column switch.

As FIGS. 1 and 2 show, the switching member 30 of the turn-signal and headlamp beam control switch 10 is guided free from play parallel to the swivelling plane on a portion 47 with regard to the center line 9 positioned diametrically opposite the swivelling axis of the switching member 30.

The guide free from play is thereby constructed as a groove-and-tongue joint. The groove 52 is formed in the portion 47 of the switching member 30. The associated tongue 53 is integrally formed onto a perpendicularly downwardly extending wall 54 of the cover 27 and fixed on the side wall 26 of the housing. For this purpose, on each of the two ends 55 and in the center 56 of the tongue 53, a projection 57 is formed which engages free from play in a recess 58 of the housing side wall 26. As FIG. 2 shows, the wall 54 and, thus, the tongue 53 extends across an angular range of about 30°. As FIG. 1 shows, the tongue 53 is crowned at its upper surface 59. In the area of this upper surface 59, the dimension of the tongue 53 perpendicular to the insulation plate 12 and, thus, to the swivelling plane corresponds exactly to the dimension of the groove 52 perpendicular to the insulation plate 12. The switching member 30 is, in its portion 47 opposite the swivelling axis 28, always guided over a large area and tiltable about a long shaft formed by the tongue 53. At its end away from the handle, the switch lever is therefore also guided over a large area in parallel to the swivelling plane 12 and, thus, transverse to its longitudinal direction by a single part, namely the tongue 53. Thus, it is thus not possible for the switch lever 32 to be inadvertently tilted about its longitudinal axis causing possible deterioration of the switching security or, at least, problems for the operator. Furthermore, the switching member is prevented from either striking the cover 27 or the insulation plate 12 which could cause noisy operation.

The locking of the switch 10 described below also is carried out with little noise. As has been indicated above, the various switching positions of the switching member 30 may be secured by means of a locking lever 45. The locking lever 45 is constructed from a resilient plastic material. As FIG. 2 shows, lever 45 is provided with a zigzag locking cam 60 and, as a separate part, is swivellably articulated to the insulation plate 12. An ear 61 pressed onto a pin 62 formed on the insulation plate 12 serves for fastening purposes. Between the ear 61 and the locking cam 60, the locking lever 45 is divided by a film hinge 63. Thereby, the insulation plate 12, which also forms a housing portion of the steering column switch, is decoupled from the locking as far as noises are concerned. Furthermore, the impact between the locking cam 60 and the locking element formed on the switching member 30 is damped and the available kinetic energy is slowly reduced. Consequently, initiation of sound waves is effectively prevented so that the switch 10 can be operated with almost no switching noise.

An axle 64 extending perpendicularly to the swivelling plane is created on the locking lever 45 by the film hinge 63, about which axle the locking cam 60 can be swivelled. The swivelling motion of the locking cam 60 is controlled by means of a leaf spring 65 which rests against the locking cam 60 at its free end 66 and is secured in an opening 68 of the housing side wall 26 at its other end 67. Thus, in spite of the elasticity of the locking cam 60, it is ensured that the switching member 30 will occupy accurate switching positions.

Figure 3:
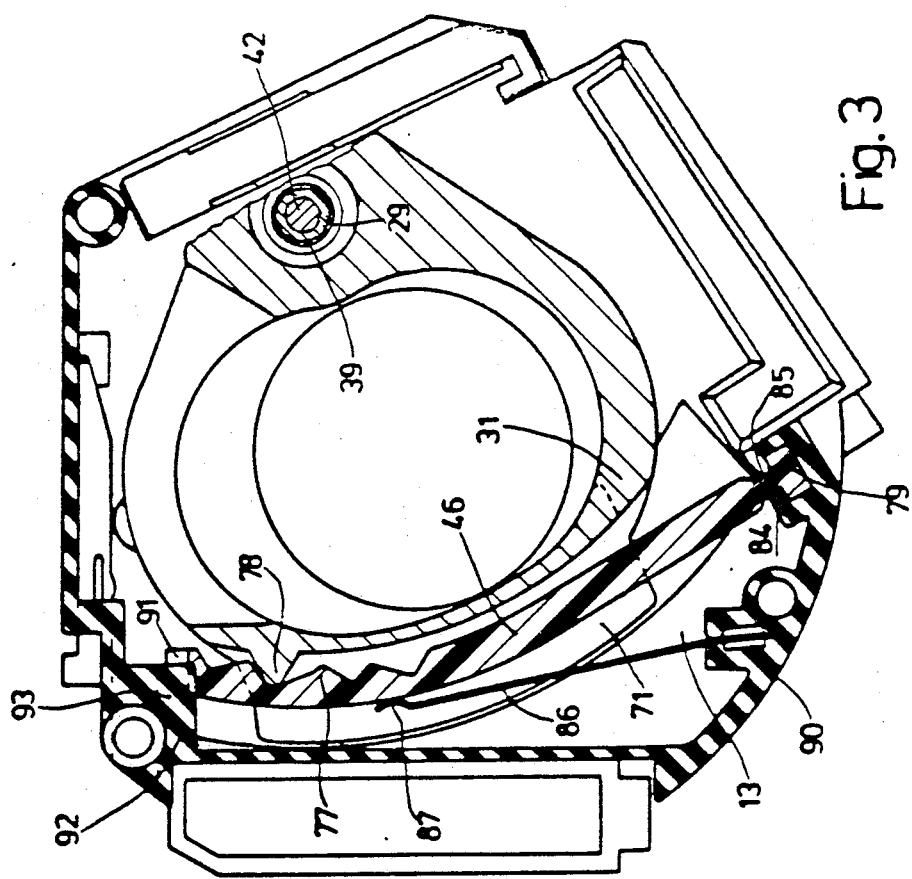
FIG. 3 is a section through a wiper-washer switch being part of the steering column switch taken on line III—III of FIG. 1, wherein all parts of the turn signal and headlamp beam control switch have been omitted.

The switching member 31 of the wiper-washer-switch 11 is also guided free from play in parallel to its swivelling plane at a section 71 which (relative to the center line 9) is diametrically opposite the pin 29. The bearing application and guidance free from play is in this case also formed as a groove-and-tongue joint. The groove 52 is formed in section 71 of the switching member 31. However, in contrast to the turn-signal and headlamp beam control switch 10 the locking lever 46 of the wiper-washer-switch 11 serves for mounting and guiding purposes. The locking lever 46 is crowned along its upper and lower longitudinal surfaces 75 and 76. As FIG. 3 shows, the portion 71 of the switching member 31 and the locking lever 46 extend over an angular range of 50°. Thus, in this case, the switching member 31 is also guided over a large segment and the switching member is tiltable about a long tilting axle realized by the locking lever 46. Thus, at its end away from the handle, the switching lever 33 is also guided over a large segment in parallel to its swivelling plane and transversely to its longitudinal direction. Accordingly, on the whole, a good bearing application and guidance of switching member and switch lever is provided.

Figure 4:
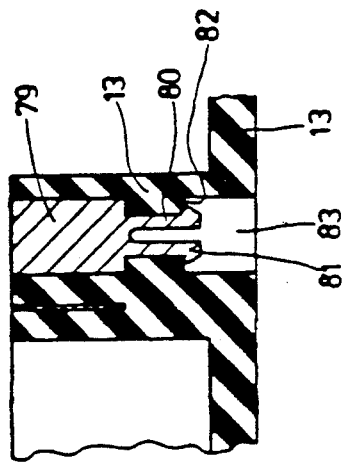
FIG. 4 is a section through the mounting place of the locking lever of the wiper-washer-switch.
Figure 5:
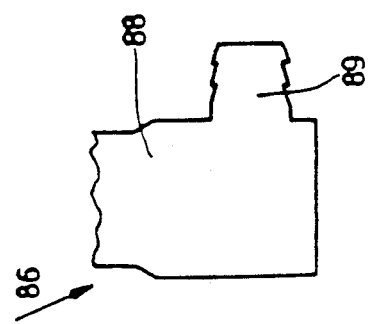
FIG. 5 is a view of the mounting-sided end of a leaf spring action upon the locking lever.

The locking lever 46 is contructed from a resilient plastic material and is equipped with a locking cam 77. The locking cam 77 cooperates with a nose-shaped locking element 78 formed on the switching member 31. As FIGS. 2 and 4 show, the locking lever 46 is a separate part swivellably articulated to the insulation plate 13. As FIG. 4 shows, the locking lever 46 is at its front end 79 equipped with perpendicularly extending legs 80 which rest against the limiting rims 82 of an opening 83 of the insulation plate 13 by means of noses 81. As FIG. 3 also shows, the locking lever 46 is divided by a film hinge 84 between its first end 29 and the locking cam 77. The locking lever 46, therefore, includes an axle 85 extending perpendicularly to the insulation plate 13, about which the locking cam 77 can swivel. The swivelling motions of the locking cam 77 are limited by a leaf spring 86 which with its free end 87 rests against the outside of the locking lever 46 and, by means of a toothed projection 89 on its other end 88, is secured free from play in a housing side wall 90. At its free end 91 which is spaced from the first end 79, the locking lever 46 is guided to be slidingly movable in a guide channel 92 extending in parallel to the swivelling plane of switching element 31. The guide channel 92 is limited by the insulation plate 13 and, also, by a limiting wall 93 formed on a perpendicularly upwardly extending projection at the outer limiting rim of the insulation plate 13. With a switching action in the direction of washing and rear window wiping, which is carried out by pulling the switch lever perpendicularly to the insulation plate 13, the switching member 31 is tilted via the locking lever 46. Due to the fact that, as has been previously mentioned, this locking lever 46 extends over a large angular range, the available tilting axle is long so that excellent guidance of the switching member 31 and of the switch lever 33 is effected. The insulation plate 13 and the housing is decoupled from the switching mechanism as far as noises are concerned by the applied locking with the locking lever 46 having a film hinge. Thus, noise problems are also prevented with regard to the wiper-washer-switch 11.

As can be seen from the foregoing, this invention can be advantageously used in steering column switches. As far as these switches are concerned the problem is presented of developing undesired noises and of difficult locking, because the switch levers are normally very long. It can, however, be seen that the present invention can also be advantageously used in other switches.

What is claimed is:

1. An electric switch having an insulation plate and having a switch lever and a switching member securely joined and jointly swivellably mounted against the insulation plate in a swivelling plane extending perpendicular to a swivelling axis which projects from the insulation plate and about which the switch lever and switching member swivel, the switch lever and switching member being tiltable from said swivelling plane, and, in the swivelling plane, said lever and switching member occupying several operating positions defined by means of a locking mechanism, said locking mechanism comprising two locking element consisting of a locking cam and a detent, one of said locking elements being positioned on a resilient locking lever, with said locking lever being swivellably mounted in said swivelling plane by a first end fastened to the insulation plate and being prestressed against the switching member by means of a spring element, said switching member being guided in the swivelling plane by the locking lever, whereby switching occurs when said switch lever and switching member are swivelled between said operating positions so as to slide at least one set of bridging contacts into and out of contact with at least one set of contact points.

2. The electric switch of claim 1 wherein the locking lever engages as a tongue in a groove formed in the switching member.

3. The electric switch of claim 1 wherein the locking lever is crowned at least on a surface extending in parallel to the swivelling plane of the switching member.

4. The electric switch of claim 1 wherein a free second end of said locking lever spaced from said first end is guided in its swivelling plane by the insulation plate.

5. The electric switch of claim 4 wherein the free end of the locking lever extends into a guide channel of the insulation plate.

6. The electric switch of claim 1 wherein the locking lever includes a film hinge as a swivelling joint.

7. The electric switch of claim 1 wherein the locking lever is clipped onto the insulation plate in the direction of the swivelling shaft by means of its first end.

8. The electric switch of claim 1 wherein the locking lever is positioned diametrically opposite to the swivelling shaft of the swithcing member relative to a center line of the insulation plate.

9. The electric switch of claim 1 wherein the length of a guide between the switching member and the insulation plate is adapted to the dimension of the switching member in the direction of the swivelling plane and to the swivelling angle of the switch lever.

10. The electric switch of claim 9 wherein the length of the guide encompasses an arc of at least 30 degrees.

* * * * *